United States Patent
Liao et al.

(10) Patent No.: US 7,711,194 B2
(45) Date of Patent: May 4, 2010

(54) IMAGE PROCESSING METHOD AND DEVICE

(75) Inventors: Wu-Jie Liao, Changhua County (TW); Meng-Yun Ying, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 757 days.

(21) Appl. No.: 11/672,052

(22) Filed: Feb. 7, 2007

(65) Prior Publication Data
US 2008/0031536 A1 Feb. 7, 2008

(30) Foreign Application Priority Data
Aug. 4, 2006 (TW) .............................. 95128598 A (51) Int. Cl.
*G06K 9/36* (2006.01)
(52) U.S. Cl. ....................... 382/232; 382/252
(58) Field of Classification Search ......... 382/232–233, 382/237, 251–253; 358/1.9, 3.03–3.05, 3.22; 345/616, 596–599
See application file for complete search history.

(56) References Cited

U.S. PATENT DOCUMENTS

| | | | | |
|---|---|---|---|---|
| 5,530,561 A * | 6/1996 | Shimazaki | ................. | 358/3.03 |
| 6,134,351 A * | 10/2000 | Waki et al. | .................. | 382/252 |
| 6,510,252 B1 * | 1/2003 | Kishimoto | ................... | 382/252 |
| 7,043,089 B2 * | 5/2006 | Ballard | ........................ | 382/237 |
| 2005/0259884 A1 * | 11/2005 | Murakami et al. | .......... | 382/252 |

* cited by examiner

*Primary Examiner*—Sherali Ishrat
(74) *Attorney, Agent, or Firm*—Winston Hsu (57) ABSTRACT

An image processing method includes: when performing quantization processing on pixel values of an image, regarding each pixel of a plurality of pixels of the image, calculating a quantization error value of the pixel, where the quantization error value corresponds to a difference between a quantized value of the pixel after the quantization processing for the pixel and an original value of the pixel before the quantization processing for the pixel; and adjusting original values of a plurality of neighboring pixels of the pixel before the quantization processing for the neighboring pixels according to the quantization error value, a plurality of weighted values, and a plurality of random numbers, where the plurality of weighted values respectively correspond to relative locations of the plurality of neighboring pixels with respect to the pixel.

20 Claims, 6 Drawing Sheets

IMAGE PROCESSING METHOD AND DEVICE

BACKGROUND OF THE INVENTION

1. Field of the Invention

The present invention relates to quantization processing of pixel values of images, and more particularly, to image processing methods and devices capable of performing adaptive random number processing.

2. Description of the Prior Art

Quantization processing is a widely developed technique in image processing. For printers, half tone processing is a typical quantization processing method, where the half tone processing can be divided into two-level half tone processing and multilevel half tone processing according to the prior art.

The quantization processing mentioned above may cause quantization errors of pixel values of a quantized image according to many prior art methods. In order to prevent differences between the quantized image and the original image from being observed easily, issues related to distributing the quantization errors among neighboring pixels within the quantized image are widely discussed in the prior art. In general, such kinds of technologies can be referred to as error diffusion processing.

Figure 1:
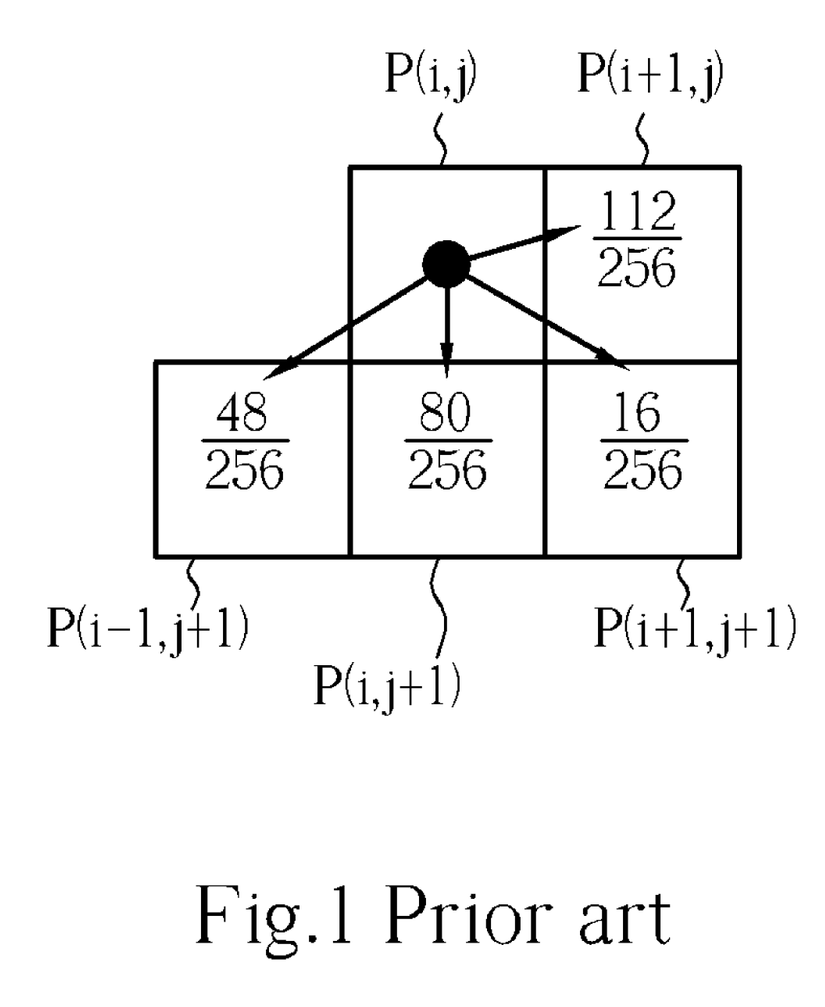
FIG. 1 is a diagram of a plurality of weighted values utilized in an error diffusion method according to the prior art.

Please refer to FIG. 1. FIG. 1 is a diagram of four weighted values $7/16$, $3/16$, $5/16$, and $1/16$ utilized in an error diffusion method according to the prior art, where the error diffusion method is provided by Floyd and Steinberg. The arrows tells how quantization errors of a pixel $P(i, j)$ are respectively distributed among its neighboring pixels $P(i+1, j)$, $P(i-1, j+1)$, $P(i, j+1)$, and $P(i+1, j+1)$ according to the weighted values $7/16$, $3/16$, $5/16$, and $1/16$ mentioned above, in order to adjust original values of the neighboring pixels $P(i+1, j)$, $P(i-1, j+1)$, $P(i, j+1)$, and $P(i+1, j+1)$ before the quantization processing for the neighboring pixel. If a printer prints a picture with gradient variations therein according to the error diffusion method mentioned above, the print out result typically has problems such as clustered points and even worm-like patterns, causing the print out quality to be unacceptable.

SUMMARY OF THE INVENTION

It is therefore an objective of the claimed invention to provide image processing methods and devices to solve the above-mentioned problem.

It is another objective of the claimed invention to provide image processing methods and devices to improve image quality of quantization processing.

It is another objective of the claimed invention to provide image processing methods and devices capable of performing adaptive random number processing.

According to one embodiment of the claimed invention, an image processing method is disclosed. The image processing method comprises: when performing quantization processing on pixel values of an image, regarding each pixel of a plurality of pixels of the image, calculating a quantization error value of the pixel, where the quantization error value corresponds to a difference between a quantized value of the pixel after the quantization processing for the pixel and an original value of the pixel before the quantization processing for the pixel; and adjusting original values of a plurality of neighboring pixels of the pixel before the quantization processing for the neighboring pixels according to the quantization error value, a plurality of weighted values, and a plurality of random numbers, wherein the plurality of weighted values respectively correspond to relative locations of the plurality of neighboring pixels with respect to the pixel.

While the image processing method mentioned above is provided, an image processing device is further disclosed according to one embodiment of the claimed invention. The image processing device comprises: a quantizer for performing quantization processing on pixel values of an image; and a quantization error calculation module, coupled to the quantizer. Regarding each pixel of a plurality of pixels of the image, the quantization error calculation module calculates a quantization error value of the pixel, where the quantization error value corresponds to a difference between a quantized value of the pixel after the quantization processing for the pixel and an original value of the pixel before the quantization processing for the pixel. The image processing device further comprises: an adjustment module, coupled to the quantizer and the quantization error calculation module, for adjusting original values of a plurality of neighboring pixels of the pixel before the quantization processing for the neighboring pixels according to the quantization error value, a plurality of weighted values, and a plurality of random numbers, where the plurality of weighted values respectively correspond to relative locations of the plurality of neighboring pixels with respect to the pixel.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
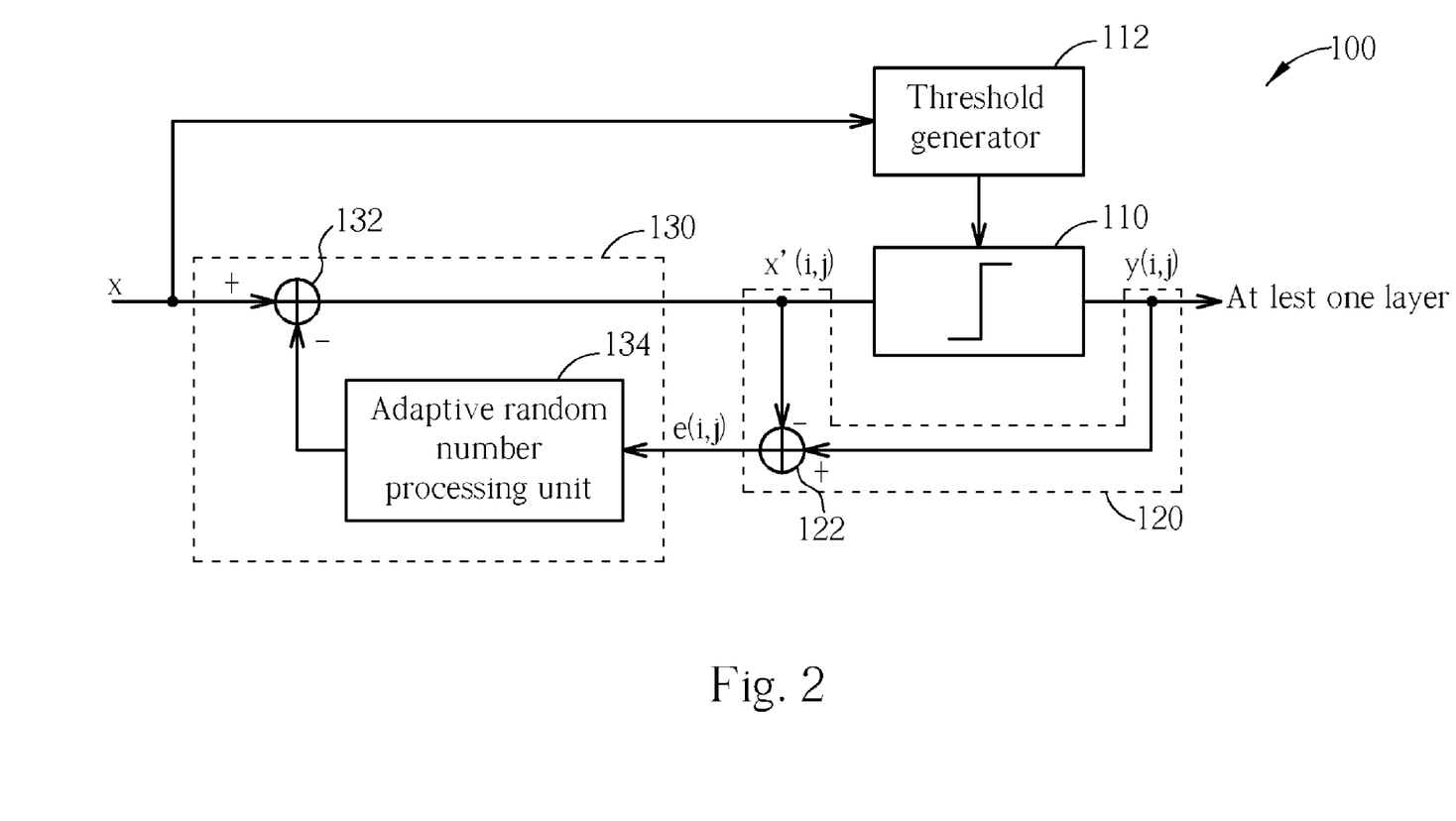
FIG. 2 is a diagram of an image processing device according to one embodiment of the present invention.

Please refer to FIG. 2. FIG. 2 is a diagram of an image processing device 100 according to one embodiment of the present invention. The image processing device 100 comprises a quantizer 110, a threshold generator 112, a quantization error calculation module 120, and an adjustment module 130. In this embodiment, the quantization error calculation module 120 comprises an arithmetic unit 122, and the adjustment module 130 comprises an arithmetic unit 132 and an adaptive random number processing unit 134.

The quantizer 110 of this embodiment is capable of performing quantization processing according to at least one quantization threshold generated by the threshold generator 112, where the quantization processing is half tone processing in this embodiment. According to an implementation choice of this embodiment, if the quantization processing is two-level half tone processing, the quantizer 110 performs the quantization processing according to one quantization threshold generated by the threshold generator 112 to generate a layer (e.g. an image layer). According to another implementation choice of this embodiment, if the quantization processing is multilevel half tone processing, the quantizer 110 performs the quantization processing according to a plurality of quantization thresholds generated by the threshold generator 112 to generate a plurality of layers.

When performing the quantization processing on pixel values of an image, regarding each pixel of a plurality of pixels of the image, for example, the pixel P(i, j), the quantization error calculation module 120 calculates a quantization error value e(i, j) of the pixel P(i, j). The quantization error value e(i, j) corresponds to a difference between a quantized value y(i, j) of the pixel P(i, j) after the quantization processing for the pixel P(i, j) and an original value x'(i, j) of the pixel P(i, j) before the quantization processing for the pixel P(i, j). Here, the original value x'(i, j) represents a corresponding original value outputted by the arithmetic unit 132 when an original value x(i, j) of the pixel P(i, j) is inputted into the arithmetic unit 132, where the processing that the arithmetic unit 132 performs on the original value x(i, j) not only can adjust the original value x(i, j) to generate the original value x'(i, j), but also can bypass the original value x(i, j) as the original value x'(i, j). In this embodiment, objects (targets) processed by the adjustment module 130 according to the quantization error value e(i, j) can be original values x(i+1, j), x(i−1, j+1), x(i, j+1), and x(i+1, j+1) of a plurality of neighboring pixels P(i+1, j), P(i−1, j+1), P(i, j+1), and P(i+1, j+1) of the pixel P(i, j) before the quantization processing for the neighboring pixels P(i+1, j), P(i−1, j+1), P(i, j+1), and P(i+1, j+1), so in FIG. 2, the original values x(i, j), x(i+1, j), x(i−1, j+1), x(i, j+1), and x(i+1, j+1) mentioned above can be labeled as x as a representative.

Figure 3:
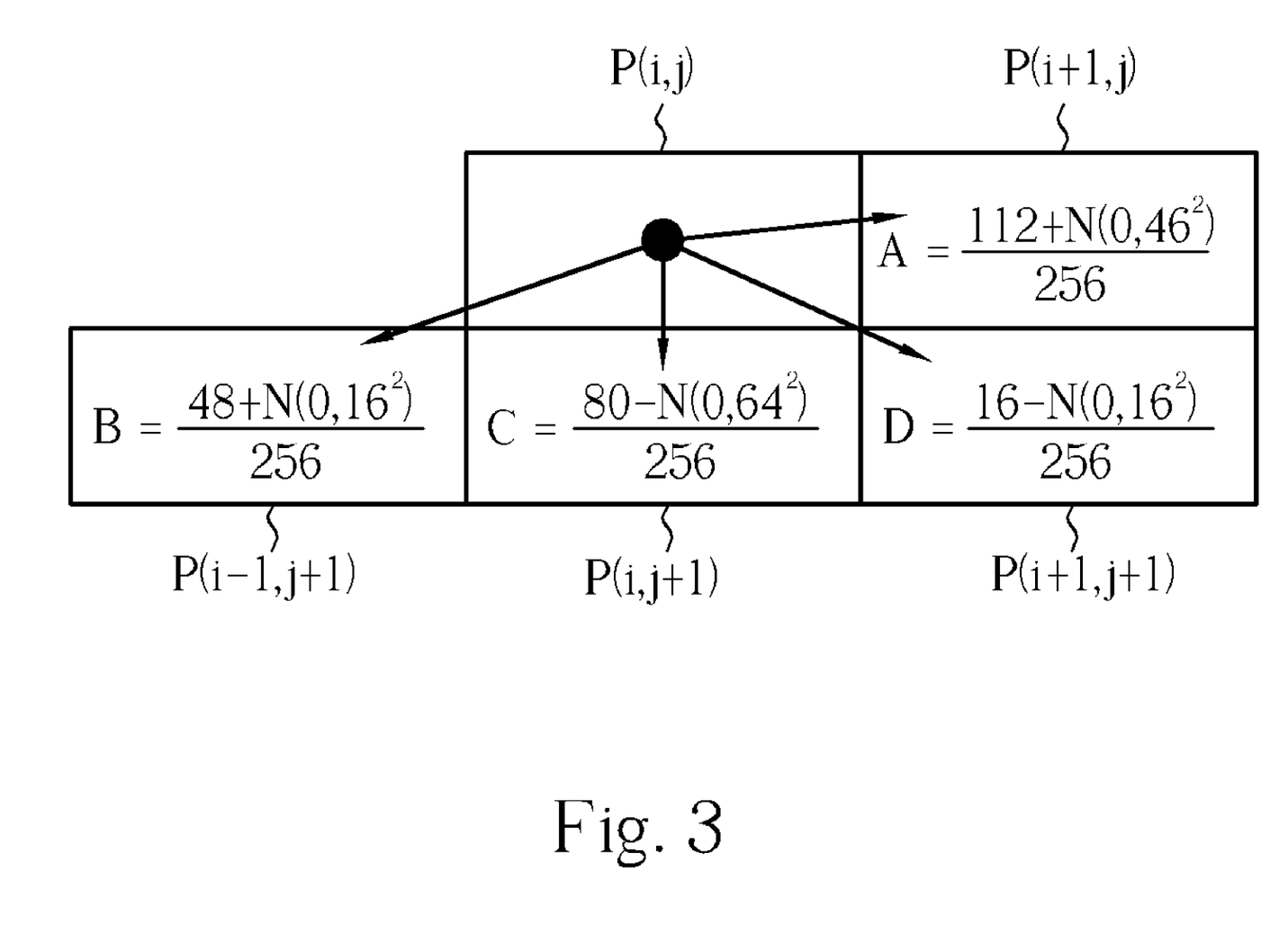
FIG. 3 is a diagram of a plurality of weighted values utilized by the adaptive random number processing unit shown in FIG. 2.

FIG. 3 is a diagram of a plurality of weighted values A, B, C, and D utilized by the adaptive random number processing unit 134 shown in FIG. 2. According to this embodiment, the adaptive random number processing unit 134 generates adjustment amounts of the original values of the neighboring pixels P(i+1, j), P(i−1, j+1), P(i, j+1), and P(i+1, j+1) mentioned above according to the quantization error value e(i, j) and a plurality of weighted values, each of which is a constant in this embodiment, and further according to a plurality of random numbers generated by a random number function N, where the adjustment amounts of the original values of the neighboring pixels P(i+1, j), P(i−1, j+1), P(i, j+1), and P(i+1, j+1) correspond to the products generated by multiplying the weighted values A, B, C, and D by the quantization error value e(i, j), respectively. In addition, the arithmetic unit 132 within the adjustment module 130 is capable of adjusting the original values x(i+1, j), x(i−1, j+1), x(i, j+1), and x(i+1, j+1) of the neighboring pixels P(i+1, j), P(i−1, j+1), P(i, j+1), and P(i+1, j+1) before the quantization processing for the neighboring pixels P(i+1, j), P(i−1, j+1), P(i, j+1), and P(i+1, j+1) according to the adjustment amounts generated by the adaptive random number processing unit 134.

In this embodiment, the adjustment amounts of the neighboring pixels P(i+1, j), P(i−1, j+1), P(i, j+1), and P(i+1, j+1) are the products generated by multiplying the weighted values A, B, C, and D by the quantization error value e(i, j), respectively. Thus, the quantization error value e(i, j) is distributed to the neighboring pixels P(i+1, j), P(i−1, j+1), P(i, j+1), and P(i+1, j+1) according to the weighted values A, B, C, and D, in order to adjust the original values of the neighboring pixels P(i+1, j), P(i−1, j+1), P(i, j+1), and P(i+1, j+1) before the quantization processing for the neighboring pixels P(i+1, j), P(i−1, j+1), P(i, j+1), and P(i+1, j+1). In addition, in this embodiment, the weighted values A, B, C, and D are respectively defined as linear combinations of the constant weighted values $112/256$, $48/256$, $80/256$, and $16/256$ and a plurality of random numbers $N(0, 64^2)$, $N(0, 16^2)$, $N(0, 64^2)$, and $N(0, 16^2)$, as shown in FIG. 3, where not only the weighted values A, B, C, and D respectively correspond to relative locations of the neighboring pixels P(i+1, j), P(i−1, j+1), P(i, j+1), and P(i+1, j+1) with respect to the pixel P(i, j), but also the constant weighted values $112/256$, $48/256$, $80/256$, and $16/256$ respectively correspond to the relative locations of the neighboring pixels P(i+1, j), P(i−1, j+1), P(i, j+1), and P(i +1, j+1) with respect to the pixel P(i, j). Thus, regarding each pixel of the plurality of pixels of the image, the adjustment module 130 is capable of adjusting the original values of the neighboring pixels of the pixel by utilizing the same set of weighted values $112/256$, $48/256$, $80/256$, and $16/256$ corresponding to the same set of relative locations and by utilizing a plurality of random numbers generated according to the random number function N.

According to this embodiment, the random number function N mentioned above can be labeled as N(m, v), and the adaptive random number processing unit 134 within the adjustment module 130 utilizes the random number function N(m, v) to generate these random numbers by assigning an average value parameter m and a variance parameter v of the random number function N(m, v). For example, the random number $N(0, 64^2)$ is a random number generated by assignment of m=0 and v=$64^2$.

According to a variation of this embodiment, the adjustment module 130 is capable of overriding these random numbers or replacing the originally generated random numbers with other newly generated random numbers, utilized for adjusting the original values of neighboring pixels of a portion of pixels. In this situation, the random number function N can be re-labeled as N(m, v, t), where the newly added time parameter t represents that the operation of the random number function N may vary in accordance with the time parameter t.

Figure 4:
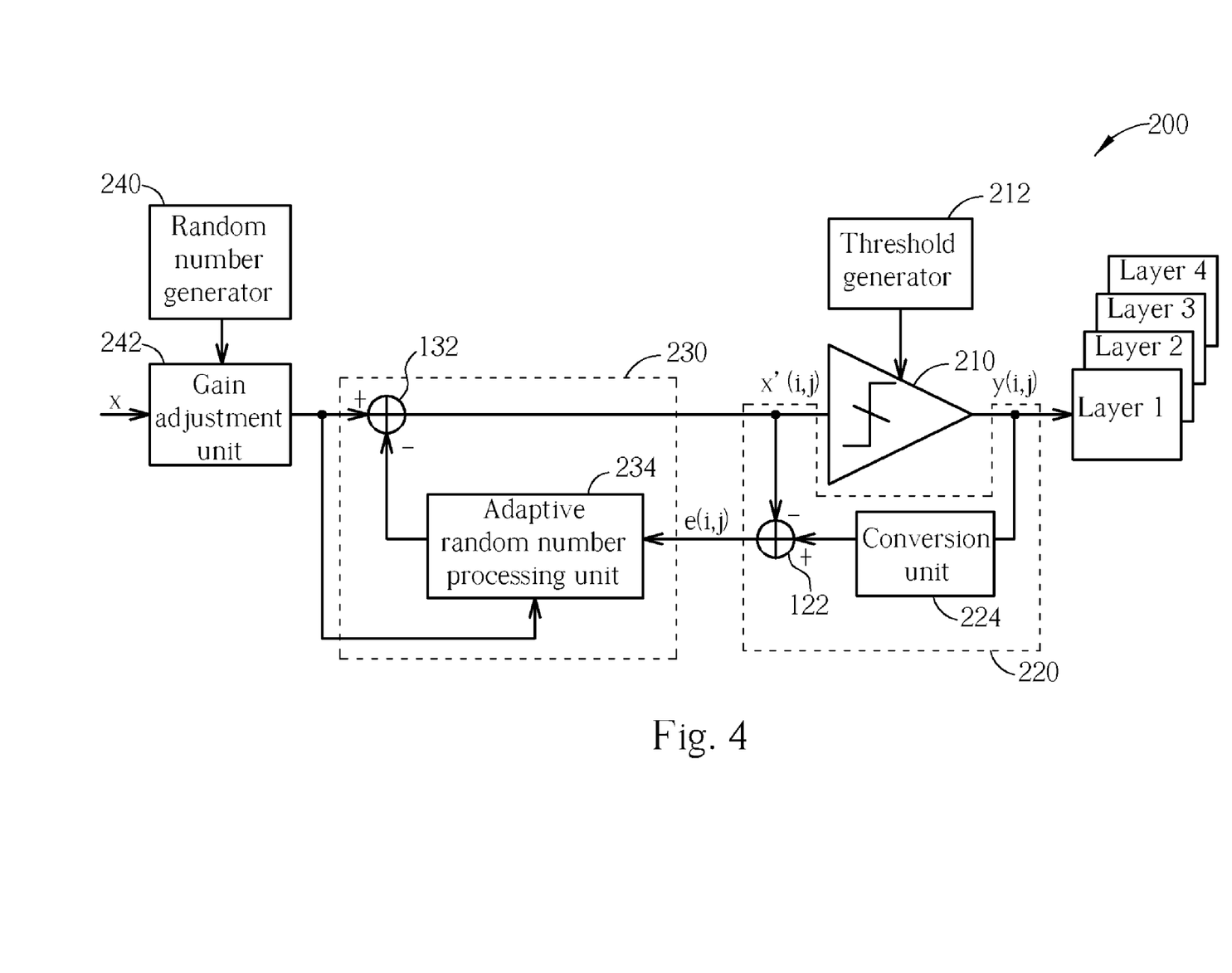
FIG. 4 is a diagram of an image processing device according to another embodiment of the present invention.

FIG. 4 is a diagram of an image processing device 200 according to another embodiment of the present invention, where this embodiment is a variation of the embodiment shown in FIG. 2. In this embodiment, the quantizer 210 performs the quantization processing according to a plurality of quantization thresholds generated by the threshold generator 212. For example, four layers are generated in this embodiment, and the plurality of quantization thresholds includes three quantization thresholds, which are 43, 128, and 213, respectively. In addition, in contrast to the quantization error calculation module 120 shown in FIG. 2, the quantization error calculation module 220 further comprises a conversion unit 224 for performing conversion on the quantized value y(i, j) according to a look-up table (LUT) representing a printer model, utilized for calculating the quantization error value e(i, j) by utilizing the arithmetic unit 122 mentioned above. Additionally, in contrast to the adjustment module 130 shown in FIG. 2, the adaptive random number processing unit 234 within the adjustment module 230 is coupled to the input terminal of the arithmetic unit 132, in order to perform pre-processing on the quantization error value e(i, j) mentioned above according to the quantization error transfer function Te shown in FIG. 5 and the original value at the input terminal of the arithmetic unit 132, where the quantization error transfer function Te of this embodiment includes two specific regions respectively corresponding to the function curve's two curvy portions, whose center values are 85 and 170. According to this embodiment, before the original value x is inputted into the arithmetic unit 132, the gain adjustment unit 242 applies slight gain adjustment to the original value x, where the gain adjustment amount applied by the gain adjustment unit 242 corresponds to the content of the LUT within the threshold generator 212 and the random numbers generated by the random number generator 240 according to the random number function N.

Figure 5:
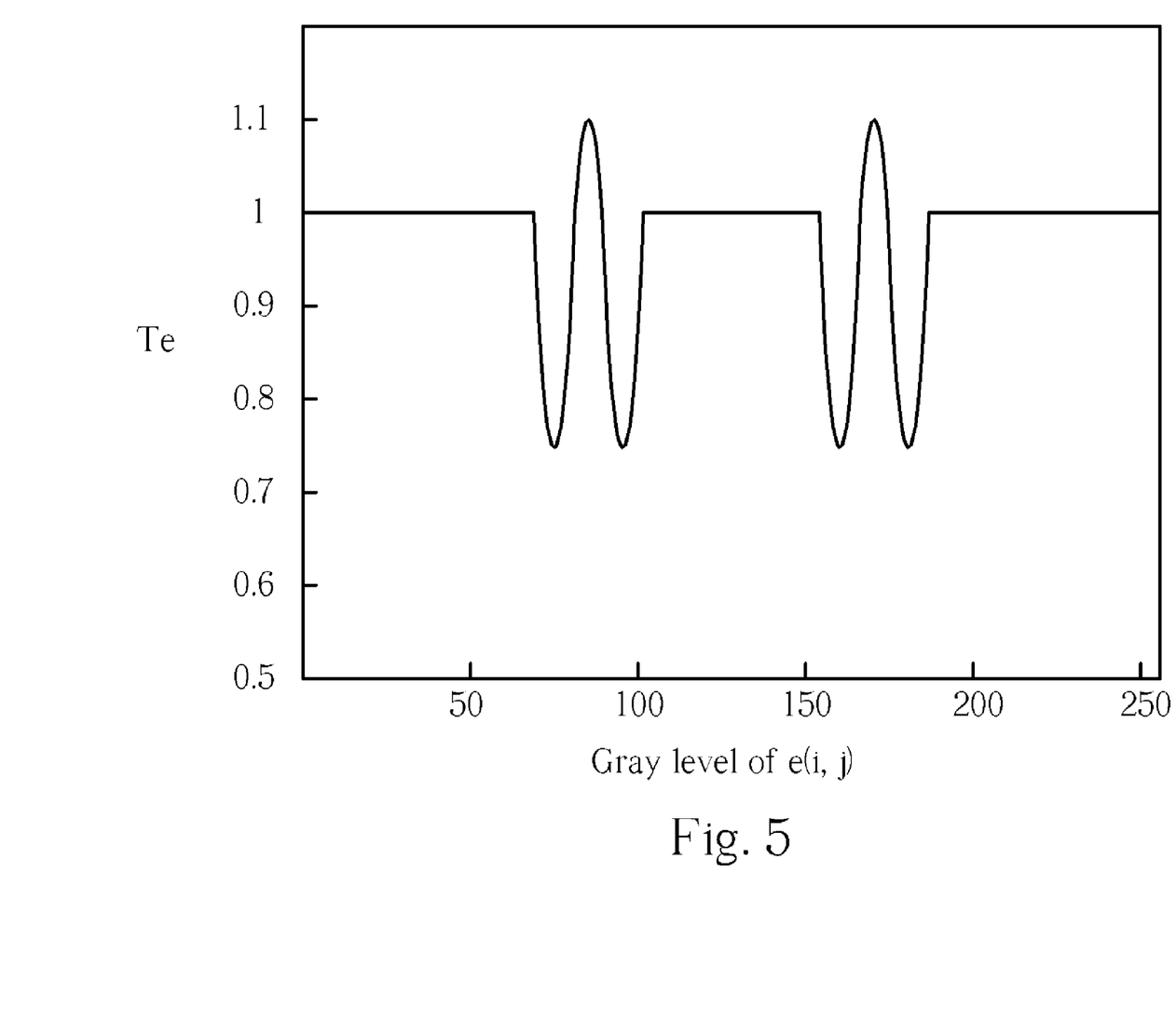
FIG. 5 is a diagram of a quantization error transfer function utilized by the adaptive random number processing unit shown in FIG. 4.

According to this embodiment, before the adaptive random number processing unit 234 within the adjustment module 230 adjusts the original values of the neighboring pixels P(i+1, j), P(i−1, j+1), P(i, j+1), and P(i+1, j+1) of the pixel P(i, j), if the original value of the pixel P(i, j) (which is the original value at the input terminal of the arithmetic unit 132 in this embodiment) falls within a specific region around one of the plurality of quantization thresholds (for example, 43 or 128 or 213), the adaptive random number processing unit 234 adjusts the magnitude of the quantization error value e(i, j) according to the relative location of the original value within the specific region, like the scaling processing represented by performing the operation of the quantization error transfer function Te shown in FIG. 5 on the quantization error value e(i, j) at one of the specific regions respectively centered at 85 and 170. As a result, the present invention is capable of reducing or eliminating phenomena of non-continuous variations around regions where the quantization error value approaches zero within a gradient image.

Figure 6:
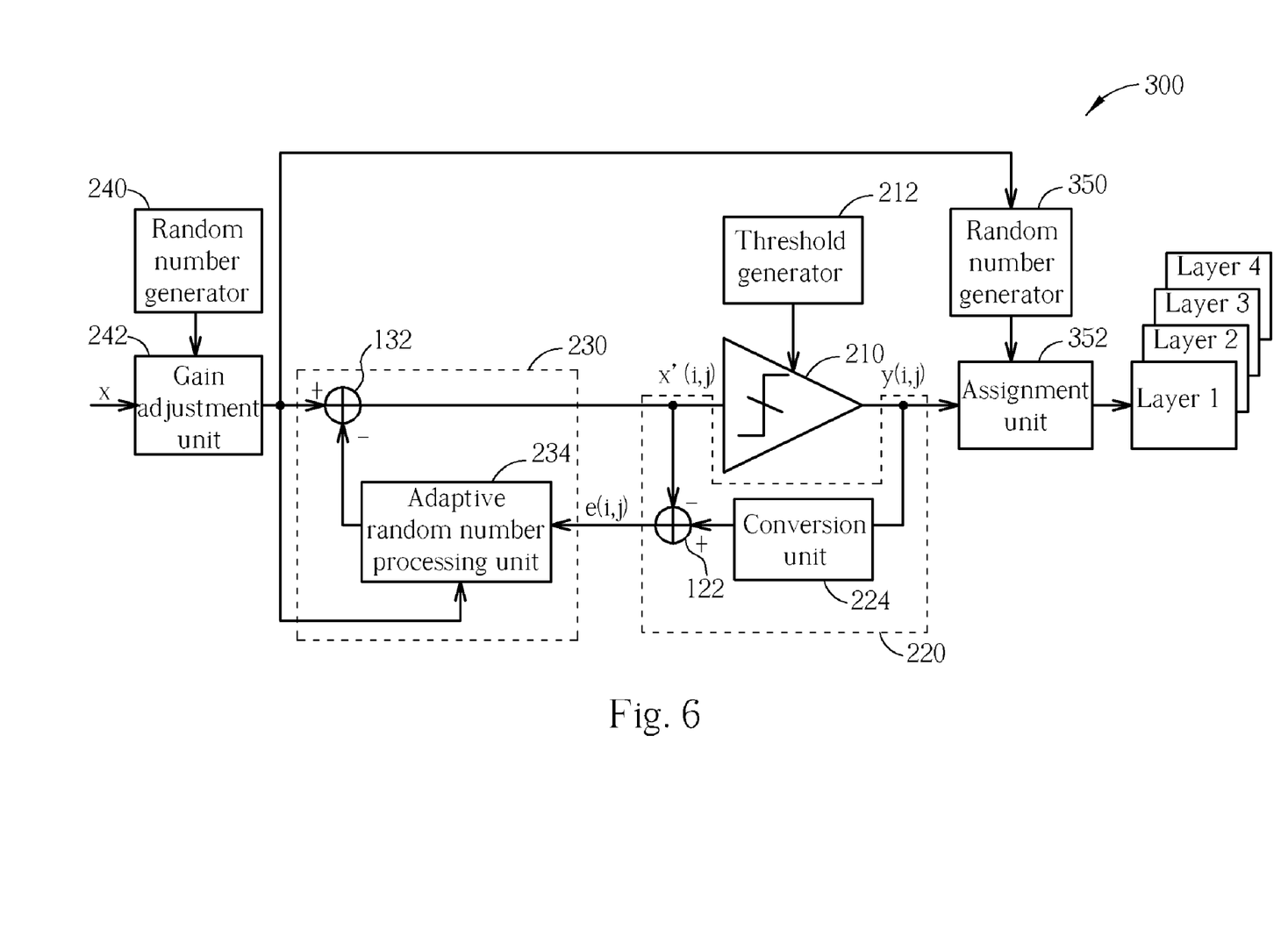
FIG. 6 is a diagram of an image processing device according to another embodiment of the present invention.

FIG. 6 is a diagram of an image processing device 300 according to another embodiment of the present invention, where this embodiment is a variation of the embodiment shown in FIG. 4. In contrast to the image processing device 200 shown in FIG. 4, the image processing device 300 further comprises a random number generator 350 and an assignment unit 352, as shown in FIG. 6. Here, the random number generator 350 is capable of generating a plurality of random numbers according to the random number function N and the original value at the input terminal of the arithmetic unit 132, and the assignment unit 352 selectively re-assigns the quantized value y(i, j) according to the random numbers generated by the random number generator 350. For example, the assignment unit 352 is capable of changing the quantized value y(i, j) to assign it to one of different layers, and is also capable of bypassing the quantized value y(i, j) to assign it to the layer where the quantized value y(i, j) originally locates. As a result, the present invention is capable of reducing or eliminating phenomena of non-continuous variations around regions where the quantization error value approaches zero within a gradient image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
when performing quantization processing on pixel values of an image, regarding each pixel of a plurality of pixels of the image, calculating a quantization error value of the pixel, wherein the quantization error value corresponds to a difference between a quantized value of the pixel after the quantization processing for the pixel and an original value of the pixel before the quantization processing for the pixel; and
adjusting original values of a plurality of neighboring pixels of the pixel before the quantization processing for the neighboring pixels according to the quantization error value, a plurality of weighted values, and a plurality of random numbers, wherein the plurality of weighted values respectively correspond to relative locations of the plurality of neighboring pixels with respect to the pixel.

2. The image processing method of claim 1, wherein the quantization processing is half tone processing.

3. The image processing method of claim 1, wherein the quantization processing is multilevel half tone processing.

4. The image processing method of claim 1, wherein the step of adjusting the original values of the plurality of neighboring pixels of the pixel before the quantization processing for the neighboring pixels further comprises:
regarding each pixel of the plurality of pixels of the image, adjusting the original values of the neighboring pixels of the pixel by utilizing the same set of weighted values corresponding to the same set of relative locations and by utilizing a plurality of random numbers.

5. The image processing method of claim 1, wherein the step of adjusting the original values of the plurality of neighboring pixels of the pixel before the quantization processing for the neighboring pixels further comprises:
regarding each neighboring pixel of the plurality of neighboring pixels, adjusting the original value of the neighboring pixel according to the quantization error value, a weighted value corresponding to the neighboring pixel within the plurality of weighted values, and a random number of the plurality of random numbers.

6. The image processing method of claim 5, wherein an adjustment amount of the neighboring pixel corresponds to a product generated by multiplying a linear combination of the weighted value and the random number by the quantization error value.

7. The image processing method of claim 1, further comprising:
generating the plurality of random numbers.

8. The image processing method of claim 7, wherein the step of generating the plurality of random numbers further comprises:
utilizing the random number function to generate the plurality of random numbers by assigning an average value parameter and a variance parameter of the random number function.

9. The image processing method of claim 1, wherein the step of adjusting the original values of the plurality of neighboring pixels of the pixel before the quantization processing for the neighboring pixels further comprises:
overriding the plurality of random numbers or replacing the originally generated random numbers by other newly generated random numbers, utilized for adjusting the original values of neighboring pixels of a portion of pixels.

10. The image processing method of claim 1, wherein the quantization processing is performed according to at least one quantization threshold, and the step of adjusting the original values of the plurality of neighboring pixels of the pixel before the quantization processing for the neighboring pixels further comprises:
before adjusting the original values of the plurality of neighboring pixels of the pixel, if the original value of the pixel falls within a specific region around a quantization threshold out of the at least one quantization threshold, adjusting the magnitude of the quantization error value according to the relative location of the original value within the specific region.

11. An image processing device, comprising:
a quantizer for performing quantization processing on pixel values of an image;
a quantization error calculation module, coupled to the quantizer, regarding each pixel of a plurality of pixels of the image, wherein the quantization error calculation module calculates a quantization error value of the pixel, and the quantization error value corresponds to a difference between a quantized value of the pixel after the quantization processing for the pixel and an original value of the pixel before the quantization processing for the pixel; and an adjustment module, coupled to the quantizer and the quantization error calculation module, for adjusting original values of a plurality of neighboring pixels of the pixel before the quantization processing for the neighboring pixels according to the quantization error value, a plurality of weighted values, and a plurality of random numbers, wherein the plurality of weighted values respectively correspond to relative locations of the plurality of neighboring pixels with respect to the pixel.

12. The image processing device of claim 11, wherein the quantization processing is half tone processing.

13. The image processing device of claim 11, wherein the quantization processing is multilevel half tone processing.

14. The image processing device of claim 11, wherein regarding each pixel of the plurality of pixels of the image, the adjustment module adjusts the original values of the neighboring pixels of the pixel by utilizing the same set of weighted values corresponding to the same set of relative locations and by utilizing a plurality of random numbers.

15. The image processing device of claim 11, wherein regarding each neighboring pixel of the plurality of neighboring pixels, the adjustment module adjusts the original value of the neighboring pixel according to the quantization error value, a weighted value corresponding to the neighboring pixel within the plurality of weighted values, and one of the plurality of random numbers.

16. The image processing device of claim 15, wherein an adjustment amount of the neighboring pixel corresponds to a product generated by multiplying a linear combination of the weighted value and the random number by the quantization error value.

17. The image processing device of claim 11, wherein the adjustment module comprises:

an adaptive random number processing unit, for generating adjustment amounts of the original values of the plurality of neighboring pixels according to the quantization error value, a plurality of weighted values, and a plurality of random numbers; and an arithmetic unit, coupled to the adaptive random number processing unit, for adjusting the original values of the plurality of neighboring pixels according to the adjustment amounts generated by the adaptive random number processing unit.

18. The image processing device of claim 11, wherein the adjustment module utilizes the random number function to generate the plurality of random numbers by assigning an average value parameter and a variance parameter of the random number function.

19. The image processing device of claim 11, wherein the adjustment module is capable of overriding the plurality of random numbers or replacing the originally generated random numbers by other newly generated random numbers, utilized for adjusting the original values of neighboring pixels of a portion of pixels.

20. The image processing device of claim 11, wherein the quantizer performs the quantization processing according to at least one quantization threshold; and before the adjustment module adjusts the original values of the plurality of neighboring pixels of the pixel, if the original value of the pixel falls within a specific region around a quantization threshold out of the at least one quantization threshold, the adjustment module adjusts the magnitude of the quantization error value according to the relative location of the original value within the specific region.

* * * * *